(12) United States Patent
Koh

(10) Patent No.: US 11,958,394 B2
(45) Date of Patent: Apr. 16, 2024

(54) LIGHTING CONTROL SYSTEM

(71) Applicant: HYUNDAI TRANSYS INC., Seosan-si (KR)

(72) Inventor: Sang Kyung Koh, Yongin-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/810,932

(22) Filed: Jul. 6, 2022

(65) Prior Publication Data

US 2023/0022026 A1 Jan. 26, 2023

(30) Foreign Application Priority Data

Jul. 14, 2021 (KR) .................. 10-2021-0092107

(51) Int. Cl.
| | | |
|---|---|---|
| *B60N 2/75* | (2018.01) | |
| *B60Q 3/233* | (2017.01) | |
| *B60Q 3/82* | (2017.01) | |
| *F21V 23/04* | (2006.01) | |
| *H05B 47/115* | (2020.01) | |

(52) U.S. Cl.
CPC ............ *B60N 2/797* (2018.02); *B60N 2/763* (2018.02); *B60Q 3/233* (2017.02); *B60Q 3/82* (2017.02); *F21V 23/0492* (2013.01); *H05B 47/115* (2020.01)

(58) Field of Classification Search
CPC ...... B60N 2/797; B60N 2/763; B60N 2/0272; B60N 2/753; B60N 2/767; B60N 2/0228; B60Q 3/233; B60Q 3/82; F21V 23/0492; H05B 47/115; H05B 47/105; H05B 47/11; H05B 47/16; B64D 11/0644; H01H 2300/008; H01H 9/182; G05D 3/12
See application file for complete search history.

(56) References Cited

U.S. PATENT DOCUMENTS

| | | | |
|---|---|---|---|
| 4,104,492 A | 8/1978 | Pliml, Jr. | |
| 6,351,072 B1 | 2/2002 | Mutoh et al. | |
| 6,733,146 B1 | 5/2004 | Vastano | |
| 2006/0062007 A1* | 3/2006 | Feldman | ............... B60Q 3/57 362/155 |
| 2012/0169093 A1* | 7/2012 | Kume | ............... G05D 1/0227 297/118 |

(Continued)

FOREIGN PATENT DOCUMENTS

| | | |
|---|---|---|
| JP | 2001097113 A | 4/2001 |
| JP | 2005104251 A | 4/2005 |

(Continued)

OTHER PUBLICATIONS

Korean Decision to Grant dated May 16, 2023; Appln. No. 10-2021-0092107.

*Primary Examiner* — Abdullah A Riyami
*Assistant Examiner* — Syed M Kaiser

(57) ABSTRACT

Disclosed is a lighting control system of a vehicle seat switch. The lighting control system includes a movable object mounted to be rotatable with respect to a stationary object, a switch mounted on the movable object and configured to emit light, a position recognizer installed in the switch to sense position information of the switch, and a controller configured to receive the position information and to adjust an intensity of light emitted by the switch based on the position information.

16 Claims, 1 Drawing Sheet

(56) References Cited

U.S. PATENT DOCUMENTS

2019/0335554 A1* 10/2019 Hodrinsky ............ H02M 7/219

FOREIGN PATENT DOCUMENTS

| KR | 2019980066074 | | 12/1998 |
|---|---|---|---|
| KR | 200425998 | Y1 | 9/2006 |
| KR | 1020070047477 | | 5/2007 |
| KR | 101714718 | | 3/2017 |
| KR | 1020190133923 | | 12/2019 |
| KR | 102257592 | | 5/2021 |
| WO | 2016/133638 | A1 | 8/2016 |
| WO | WO-2020032863 | A1 * | 2/2020 |

* cited by examiner

LIGHTING CONTROL SYSTEM

CROSS-REFERENCE TO RELATED APPLICATION

This application claims the benefit of Korean Patent Application No. 10-2021-0092107, filed on Jul. 14, 2021, the entireties of which are incorporated herein by reference.

BACKGROUND

(a) Technical Field

The present disclosure relates to a lighting control system. More particularly, it relates to a lighting control system of a vehicle seat switch.

(b) Background Art

Multiple switches for controlling devices in a vehicle are provided on a center fascia around a driver's seat. For example, in case of a power seat, seat switches which may control the angle of a backrest, the forward and backward position of the seat, the height of the seat, etc., are provided. Among the seat switches, a seat switch shaped as a seat and configured to radiate light so as to improve visibility at night and appearance has appeared.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide a lighting control system which may effectively control the lighting of a seat switch.

In one aspect, the present invention provides a lighting control system including a movable object mounted to be rotatable with respect to a stationary object, a switch mounted on the movable object and configured to emit light, a position recognizer installed in the switch to sense position information of the switch, and a controller configured to receive the position information and to adjust an intensity of light emitted by the switch based on the position information.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
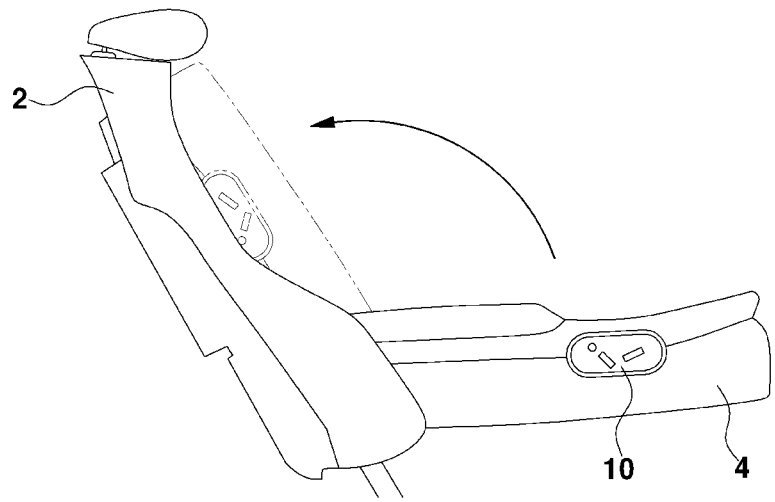
FIG. 1 is a view illustrating an exemplary object of application of a lighting control system according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Specific structural or functional descriptions in embodiments of the present invention set forth in the description which follows will be exemplarily given to describe the embodiments of the present invention, and the present invention may be embodied in many alternative forms. Further, it will be understood that the present invention should not be construed as being limited to the embodiments set forth herein, and the embodiments of the present invention are provided only to completely disclose the invention and cover modifications, equivalents or alternatives which come within the scope and technical range of the invention.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Hereinafter, the present invention will be described in detail with reference to the accompanying drawings.

A lighting control system according to the present invention may perform effective lighting control. The lighting control system according to the present invention may control lighting to be turned off in a state in which the lighting is not needed, thereby being capable of preventing glare. Further, the lighting control system according to the present invention may exhibit a fade—in function in which, when the lighting is turned on, the brightness of the lighting is gradually increased until it reaches set maximum brightness, and a fade-out function in which, when the lighting is turned off, the brightness of the lighting is gradually decreased, thereby being capable of providing visual luxuriousness.

According to a detailed example of application, the lighting may be mounted on a movable object which is moved or rotated with respect to a stationary object which is fixed. In case in which the movable object may be accommodable in the stationary object, such as by rotation, i.e., the movable object includes an unfolded position and a folded position, use of the lighting may not be required in the folded position. Further, when the movable object is folded and housed in the stationary object, leakage of light emitted by the lighting may cause glare. Therefore, According to the present invention, the lighting may be controlled to shut off such as when illumination of the lighting is not necessary as in the folded position or the illumination needs to be blocked.

Further, according to the present invention, while the lighting is turned on or off, the fade—in function or the fade-out function is performed. In more detail, when the movable object is rotated with respect to the stationary object to move from the unfolded position to the folded position or from the folded position to the unfolded position, the lighting control system according to the present invention may control the lighting to fade in or fade out, thereby being capable of improving visual aesthetics.

Referring to FIG. 1, according to the present invention, as a non-restrictive example, a stationary object may be a rear seat 2 of a vehicle, and a movable object may be an armrest 4 for rear seats. Further, lighting may be a seat switch (hereinafter referred to as a switch 10) mounted on the armrest 4.

Hereinafter, an exemplary embodiment of the present invention will be described assuming that the stationary object is the rear seat 2, the movable object is the armrest 4 for rear seats, and the lighting is the switch 10 configured to emit light. However, the lighting control system according to the present invention is applicable to any system having the above-described relationships between a stationary object, a movable object and lighting.

The armrest 4 is coupled to the rear seat 2 of the vehicle. The armrest 4 is coupled to the rear seat 2 so as to be rotatable with respect to the rear seat 2.

The armrest 4 may include an unfolded position or an open position in the state in which a passenger of the vehicle uses the armrest 4. The armrest 4 at the open position may be placed approximately parallel to the horizontal direction.

The armrest 4 may be configured to be foldable with respect to the rear seat 2. When the armrest 4 is not used, the armrest 4 may be rotated and housed in the rear sear 2. Therefore, in addition to the open position, the armrest 4 may include a folded position or a closed position in the state in which the passenger does not use the armrest 4. That is, the armrest 4 is configured to be rotated between the open position and the closed position with respect to the rear seat 2.

The switch 10 is mounted on the armrest 4. The angle or the like of the rear seat 2 may be adjusted through operation of the switch 10. According to the present invention, the switch 10 includes a light emitting unit, so the switch 10 is controlled to emit light at the open position of the armrest 4 and to stop emission of light or to emit light at the minimum brightness at the closed position of the armrest 4. Further, the switch 10 is controlled to perform the fade—in function or the fade-out function between the open position and the closed position of the armrest 4.

Figure 2:
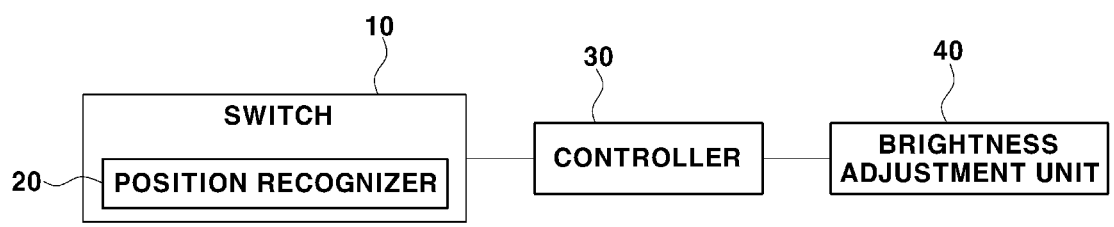
FIG. 2 is a block diagram of the lighting control system according to the present invention.

Referring to FIG. 2, a position recognizer 20 is installed in the switch 10. The position recognizer 20 is configured to recognize the position of the armrest 4 when the armrest 4 is rotated. Put differently, the position recognizer 20 is configured to recognize the angle of the armrest 4. According to one implementation of the present invention, the position recognizer 20 is a G-sensor which may detect the position of the sensor by recognizing changes in six planes.

Further, the position recognizer 20 may determine whether or not the armrest 4 is being opened or closed. For example, the position recognizer 20 may determine whether or not the armrest 4 is being opened or closed based on a point in time when the angle of the armrest 4 is changed within the range of 50° to 80° from the horizon.

A controller 30 is configured to receive the position information of the switch 10 from the position recognizer 20, and to adjust the intensity of light emitted by the switch 10 based on the received position information.

More concretely, the controller 30 is configured to perform fade—in or fade-out of the switch 10 based on the position information from the position recognizer 20. The controller 30 performs the fade-out of the light emitting unit of the switch 10 when the armrest 4 is rotated from the open position to the closed position. On the contrary, the controller 30 performs the fade—in of the light emitting unit of the switch 10 when the armrest 4 is rotated from the closed position to the open position.

When the armrest 4 is at the open position, the switch 10 is controlled to emit light with a maximum brightness. The maximum brightness represents that the light by the switch 10 is the brightest among all positions of the armrest 4. The maximum brightness may be set or adjusted by an external input to the controller 30.

According to one implementation of the present invention, the controller 30 is configured to communicate with a brightness adjustment unit 40. The brightness adjustment unit 40 is configured to adjust the maximum brightness of light which may be emitted by the switch 10. The maximum brightness adjusted by the brightness adjustment unit 40 (hereinafter referred to as a set brightness S1) may be transmitted to the controller 30, and the controller 30 may perform the fade—in or the fade-out of the switch 10 within the range of the set brightness S1 transmitted from the brightness adjustment unit 40.

According to one implementation of the present invention, the brightness adjustment unit 40 is a rheostat provided in the cluster of the vehicle. That is, the controller 30 receives the set brightness S1 set by the rheostat, and controls the switch 10 to emit light at the set brightness S1 at the open position of the armrest 4. Through adjustment using the rheostat, stages for the lighting are displayed on the cluster and thus mood lighting of the vehicle may be adjusted.

For example, as set forth in Table 1 below, the fade—in time or the fade-out time of the switch 10 may be set depending on the set brightness S1 set by the brightness adjustment unit 40 or the rheostat. Here, the set brightness S1 indicates brightness, as the name thereof suggests. That is, the set brightness S1 indicates the maximum brightness when the set brightness S1 is the maximum value, indicates the minimum brightness when the set brightness S1 is the minimum value, indicates brightness within a range greater than a medium low value range but less than the maximum value when the set brightness S1 is within a medium high value range, and indicates brightness within a range greater than the minimum value but less than the medium high value range when the set brightness S1 is within the medium low value range. Further, a set fade time F which is the fade—in time or the fade-out time is gradually increased from bottom to top in the column. That is, the relation A>B>C>D is satisfied.

TABLE 1

| Set brightness (S1) | Set fade time (F) (fade-in or fade-out time) |
|---|---|
| Maximum value | A second(s) |
| Minimum value | B second(s) |
| Medium high value range | C second(s) |
| Medium low value range | D second(s) |

While the armrest 4 is rotated from the closed position to the open position, the controller 30 performs the fade—in of the switch 10 at the set brightness S1 for the set fade time F. For example, when the set brightness S1 is within the medium high value range, the controller 30 performs the fade—in of the switch 10 for C seconds, and controls the switch 10 to emit light at a brightness within the medium high value range when the armrest 40 is located at the open position.

While the armrest 4 is rotated from the open position to the closed position, the controller 30 performs the fade-out of the switch 10 so that the set brightness S1 of light emitted by the switch 10 is gradually decreased for the set fade-out time F set forth in the above Table 1. For example, when the set brightness S1 is the maximum value, the controller 30 performs the fade-out of the switch 10 so that the set brightness S1 of light emitted by the switch 10 is gradually decreased for A seconds.

When the armrest 4 is located at the closed position, the controller 30 controls the switch 10 to emit light at the minimum brightness among the brightness values at all the positions of the armrest 4. Here, the minimum brightness may mean that the switch 10 is turned off so that light emission of the switch 10 is blocked. Further, while the armrest 4 is rotated from the closed position to the open position, the controller 30 performs the fade—in of the switch 10 so that the intensity of light emitted by the switch 10 is increased from the minimum brightness to the maximum brightness. For example, while the armrest 4 is rotated from the closed position to the open position, the controller 30 performs the fade—in of the switch 10, which has been turned off, for the fade—in time F set forth in the above Table 1.

According to some embodiments of the present invention, logic to cope with change of the direction of the armrest 4 during the fade—in or the fade-out of the switch 10 due to rotation of the armrest 4. That is, when the position recognizer 20 senses angular change while the fade—in or the fade-out of the switch 10 is performed due to rotation of the armrest 4, the controller 30 immediately stops the fade—in or the fade-out of the switch 10, and performs the fade-out or the fade—in of the switch 10 for an operation time T1 depending on a brightness condition. Here, the operation time T indicates the remainder of the set fade time F when the direction of the armrest 4 is changed during the fade—in or the fade-out of the switch 10.

TABLE 2

| Set brightness (S1) | Set fade time (F) (fade-in or fade-out time) | Operation time (T1) after angular change of armrest during fade-in or fade-out |
|---|---|---|
| Maximum value | A second(s) | Operation time (T1) = Fade time that has been elapsed until now |
| Minimum value | B second(s) | |
| Medium high value range | C second(s) | |
| Medium low value range | D second(s) | |

As set forth in Table 2 above, the operation time T1 may be a fade time that has been elapsed until now. Concretely, when the direction of the armrest 4 is changed towards the open position while the armrest 4 is rotated from the open position to the closed position, the controller 30 increases the intensity of light emitted by the switch 10 for a same time period as the time taken for the armrest 4 to be moved from the open position to a point in time when the direction of the armrest 4 is changed. For example, it may be assumed that A second(s) is 4 seconds. When, among the set fade time of 4 seconds, 3 seconds are taken for the armrest 4 to be moved from the open position to the closed position and then the armrest 4 is moved again to the open position, the controller 30 controls the switch 10 to perform the fade—in for the same time as the elapsed time, i.e., 3 seconds, from a point in time when the direction of the armrest 4 is changed. That is, the operation time T1 may be 3 seconds.

Similarly, when the direction of the armrest 1 is changed to the closed position while the armrest 4 is rotated from the closed position to the open position, the controller 30 may decrease the intensity of light emitted by the switch 10 for the same time as a time taken for the armrest 4 to be moved from the closed position to a point in time when the direction of the armrest 4 is changed.

According to some embodiments of the present invention, when the set brightness S1 is changed by the brightness adjustment unit 40 during the fade-out of the switch 10 where the armrest 4 is moved from the open position to the closed position, the controller 30 continues to perform the fade-out of the switch 10 while ignoring the change in the set brightness S1.

On the other hand, when the set brightness S1 is increased by the brightness adjustment unit 40 during the fade—in of the switch 10 where the armrest 4 is rotated from the closed position to the open position, i.e., when the set brightness S1 is increased to a corrected set brightness S2, the controller 30 controls the switch 10 to perform the fade—in towards the corrected set brightness S2.

TABLE 3

| Current brightness (B) | Corrected set brightness (S2) | Operation time (T2) when corrected set brightness (S2) is higher than current brightness (B) during fade-in |
|---|---|---|
| Minimum value | Medium high value range | C second(s) – elapsed time of fade-in |
| | Minimum value | B second(s) – elapsed time of fade-in |
| | Maximum value | A second(s) – elapsed time of fade-in |
| Medium low value | Minimum value | B second(s) – elapsed time of fade-in |
| | Maximum value | A second(s) – elapsed time of fade-in |
| Medium high value | Maximum value | A second(s) – elapsed time of fade-in |

Here, the remaining operation time T2 of the fade—in of the switch 10 after the corrected set brightness S2 has been received may be set forth in Table 3 above. The operation time T2 may be acquired by subtracting time taken before the set brightness S1 is increased by the brightness adjustment unit 40 from predetermined time taken for the switch 10 to perform the fade—in with the corrected set brightness S2.

Further, when the set brightness S1 is decreased by the brightness adjustment unit 40 during the fade—in of the switch 10 where the armrest 4 is rotated from the closed position to the open position, the controller 30 stops the fade—in of the switch 10 and immediately changes the set brightness S1 to the corrected set brightness S2.

The lighting control system according to the present invention may implement natural fade—in or fade-out of mood lighting of the seat switch 10 provided in a seat shape and mounted on the rear seat depending on the angle information of the armrest 4.

Further, the lighting control system according to the present invention may receive the angle information using a G-sensor installed in the seat switch 10, and vary the fade—in or fade-out time of the switch 10 depending on the current brightness of the lighting, thereby being capable of performing a natural mood lighting turn-on/off function.

Ultimately, when the lighting control system according to the present invention is applied to a rear seat of a vehicle, the lighting control system may prevent lighting from being exposed when an armrest is folded and housed in the rear seat, and may provide visual luxuriousness caused by addition of the fade—in and fade-out functions.

As is apparent from the above description, the present invention provides a lighting control system which may effectively control the lighting of a seat switch.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A lighting control system for a vehicle, comprising:
   an armrest rotatably mounted on a seat of the vehicle, the armrest mounted to be rotatable with respect to the seat, the seat being stationary;
   a switch mounted on the armrest and configured to emit light;
   a position recognizer installed in the switch to sense angular position information of the armrest; and
   a controller configured to receive the angular position information and to adjust an intensity of light emitted by the switch based on the angular position information;
   wherein the controller controls the switch to performs fade-out based on the angular position information so that the intensity of light emitted by the switch is gradually decreased when the armrest is rotated in a first direction, and
   the controller controls the switch to perform fade-in based on the angular position information so that the intensity of light emitted by the switch is gradually increased when the armrest is rotated in a second direction opposite to the first direction.

2. The lighting control system of claim 1, wherein the armrest is configured to be rotated between an open position at which the armrest is completely unfolded from the seat and a closed position at which the armrest is folded and housed in the seat.

3. The lighting control system of claim 2, wherein, when the armrest is located at the open position, the switch emits light at a set maximum brightness that is a maximum brightness among positions of the armrest, the set brightness is adjustable by a brightness adjustment unit configured to communicate with the controller.

4. The lighting control system of claim 3, wherein the controller performs the fade-out of the switch where the intensity of light emitted by the switch is gradually decreased from the set brightness, when the armrest is rotated from the open position to the closed position.

5. The lighting control system of claim 4, wherein the controller controls the switch to emit light at a set minimum brightness that is a minimum brightness among the positions of the armrest when the armrest is located at the closed position.

6. The lighting control system of claim 5, wherein the controller performs the fade-in of the switch where the intensity of light emitted by the switch is increased from the set minimum brightness to the set maximum brightness, when the armrest is rotated from the closed position to the open position.

7. The lighting control system of claim 5, wherein the set minimum brightness is a brightness in a state in which light emission of the switch is blocked.

8. The lighting control system of claim 6, wherein a time period taken for the switch to perform the fade-in or the fade-out is varied depending on the set brightness set by the brightness adjustment unit.

9. The lighting control system of claim 8, wherein the controller increases the intensity of light emitted by the switch for a same time period as a time period taken for the armrest to be moved from the open position to a point in time when a direction of the armrest is changed, when the direction of the armrest is changed towards the open position while the armrest is rotated from the open position to the closed position.

10. The lighting control system of claim 8, wherein the controller decreases the intensity of light emitted by the switch for a same time period as a time period taken for the armrest to be moved from the closed position to a point in time when a direction of the armrest is changed, when the direction of the armrest is changed towards the closed position while the armrest is rotated from the closed position to the open position.

11. The lighting control system of claim 3, wherein, when the set brightness is increased by the brightness adjustment unit while the armrest is rotated from the closed position to the open position, the controller immediately performs the fade-in of the switch towards the increased set brightness,
   wherein the fade-in of the switch is performed for a time period acquired by subtracting a time period taken before the set brightness is increased by the brightness adjustment unit from a predetermined time period taken to perform the fade-in of the switch to the increased set brightness.

12. The lighting control system of claim 3, wherein, when the set brightness is decreased by the brightness adjustment unit while the armrest is rotated from the closed position to the open position, the controller stops the fade-in of the switch and changes a current brightness into the decreased set brightness.

13. The lighting control system of claim 1, wherein the switch is a seat switch provided in a seat shape and mounted on the armrest.

14. The lighting control system of claim 13, wherein:
   the armrest is rotatable between the open position and the closed position; and the armrest is completely unfolded from the seat at the open position, and is completely folded towards the seat at the closed position.

15. The lighting control system of claim 13, wherein the brightness adjustment unit comprises a rheostat provided in a cluster of the vehicle.

16. The lighting control system of claim 1, wherein the position recognizer is a G-sensor.

\* \* \* \* \*